United States Patent
Ogiwara et al.

(10) Patent No.: US 10,788,161 B2
(45) Date of Patent: Sep. 29, 2020

(54) HIGH PRESSURE TANK APPARATUS

(71) Applicant: HONDA MOTOR CO., LTD., Minato-ku, Tokyo (JP)

(72) Inventors: Naoki Ogiwara, Wako (JP); Takatsugu Koyama, Wako (JP); Toshihiko Kanezaki, Wako (JP); Jin Nishio, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/294,226

(22) Filed: Mar. 6, 2019

(65) Prior Publication Data

US 2019/0277451 A1 Sep. 12, 2019

(30) Foreign Application Priority Data

Mar. 7, 2018 (JP) .................. 2018-040390

(51) Int. Cl.
*F16K 23/00* (2006.01)
*F17C 7/02* (2006.01)
(Continued)

(52) U.S. Cl.
CPC .......... *F17C 7/02* (2013.01); *B60K 15/03006* (2013.01); *F17C 13/02* (2013.01);
(Continued)

(58) Field of Classification Search
CPC .... F17C 7/02; F17C 13/02; F17C 2203/0604; F17C 2260/037
See application file for complete search history.

(56) References Cited

U.S. PATENT DOCUMENTS 3,137,405 A * 6/1964 Gorcey ................ F17C 1/10
220/590
5,794,979 A 8/1998 Kasuga et al.
(Continued)

FOREIGN PATENT DOCUMENTS

JP     H08-99543 A      4/1996
JP     2003-172500 A    6/2003
(Continued)

OTHER PUBLICATIONS

Office Action dated Jan. 7, 2020 issued over the corresponding Japanese Patent Application No. 2018-040390 with the English translation thereof.
(Continued)

*Primary Examiner* — Reinaldo Sanchez-Medina
(74) *Attorney, Agent, or Firm* — Carrier Blackman & Associates, P.C.; Joseph P. Carrier; Jeffrey T. Gedeon (57) ABSTRACT

A high pressure tank apparatus includes a high pressure tank, a leaked fluid container, and a supply/discharge side discharge flow path. The high pressure tank includes a liner made of resin, a reinforced layer that covers an outer surface of the liner, an insertion member that has formed therein a supply/discharge hole capable of communicating with an inside of the liner and the supply/discharge flow path; and a supply/discharge side cap in which are formed an insertion hole through which the insertion member is inserted and a supply/discharge side draw-out hole that draws out the fluid interposed between the liner and the reinforced layer. The supply/discharge side discharge flow path guides a temporarily released fluid that is the fluid drawn out via the supply/discharge side draw-out hole to a discharge region.

4 Claims, 5 Drawing Sheets

(51) Int. Cl.
  *F17C 13/02* (2006.01)
  *B60K 15/03* (2006.01)
(52) U.S. Cl.
  CPC ............. *B60K 2015/0321* (2013.01); *B60K 2015/03315* (2013.01); *F17C 2205/0305* (2013.01); *F17C 2221/012* (2013.01); *F17C 2260/038* (2013.01); *F17C 2270/0184* (2013.01)

(56) References Cited

U.S. PATENT DOCUMENTS

| | | | |
|---|---|---|---|
| 8,998,024 B2 | 4/2015 | Franzen et al. | |
| 9,217,539 B2* | 12/2015 | Ishitoya | B60K 15/07 |
| 9,347,560 B2* | 5/2016 | Lindner | F16J 12/00 |
| 2003/0066836 A1* | 4/2003 | Sakaguchi | F17C 1/06 |
| | | | 220/581 |
| 2010/0163565 A1* | 7/2010 | Matsuoka | F16J 13/12 |
| | | | 220/581 |
| 2011/0233218 A1* | 9/2011 | Uchimura | F17C 1/06 |
| | | | 220/581 |
| 2012/0291878 A1* | 11/2012 | Pisot | F17C 1/06 |
| | | | 137/315.01 |

FOREIGN PATENT DOCUMENTS

| | | |
|---|---|---|
| JP | 2009-243675 A | 10/2009 |
| JP | 2013-532809 A | 8/2013 |
| JP | 2015-155736 A | 8/2015 |
| JP | 2016-183687 A | 10/2016 |

OTHER PUBLICATIONS

Office Action dated May 12, 2020 issued over the corresponding Japanese Patent Application No. 2018-040390 with the English translation thereof.

* cited by examiner

FIG. 5 ical Patent Application No. 2018-040390 filed on Mar. 7, 2018, the contents of which are incorporated herein by reference.

HIGH PRESSURE TANK APPARATUS

CROSS-REFERENCE TO RELATED APPLICATION

This application is based upon and claims the benefit of priority from Japanese Patent Application No. 2018-040390 filed on Mar. 7, 2018, the contents of which are incorporated herein by reference.

BACKGROUND OF THE INVENTION

Field of the Invention

The present invention relates to a high pressure tank apparatus that includes a high pressure tank in which fluid is supplied to and discharged from a resin liner of the high pressure tank via a supply/discharge flow path.

Description of the Related Art

A high pressure tank is known that includes a resin liner capable of storing fluid therein, a reinforced layer made of fiber-reinforced plastic or the like covering the outer surface of the liner, a cap that is provided in an opening in the liner and the reinforced layer and has an insertion hole formed therein through which the inside and outside of the liner are in communication, and an insertion member that is inserted into the insertion hole. A supply/discharge hole is formed penetrating through the insertion member, and a supply/discharge flow path for supplying and discharging the fluid inside the liner is connected to this supply/discharge hole via a connecting portion. Furthermore, the insertion member houses a main stop valve capable of switching between communication and cutoff between the supply/discharge flow path and the inside of the liner, via the supply/discharge hole.

In the high pressure tank apparatus including this type of high pressure tank, a configuration capable of sensing that fluid is leaking from the high pressure tank or the like when there is an abnormality is usually included. When leakage is sensed during an abnormality, countermeasures such as closing the main stop valve described above to stop the supply of the fluid are taken. The configuration that is capable of sensing leakage during an abnormality includes a container surrounding the high pressure tank, supply/discharge flow path, and the like to contain the leaked fluid and a sensor that senses the fluid in this container.

In a high pressure tank including a resin liner, there are cases where the fluid passes through the liner and intrudes into a region (also referred to below as a covered portion) between the outer surface of the liner and the reinforced layer, such as described in Japanese Laid-Open Patent Publication No. 2009-243675, for example. When fluid collects in the covered portion, there is a concern that a phenomena such as the liner and reinforced layer peeling away from each other and the liner experiencing buckling that causes the liner to protrude toward the inside thereof will occur. Therefore, the fluid that has passed through the liner and intruded into the covered portion is preferably expelled to the outside of this covered portion.

The fluid drawn out from the covered portion (or regularly released fluid, also referred to below as temporarily released fluid) occurs in a temporarily limited amount, and is therefore discharged to the outside the high pressure tank as part of the normal operation cycle of the high pressure tank apparatus. In other words, the temporarily released fluid is different from the leaked fluid that leaks out when an abnormality occurs in the high pressure tank apparatus.

SUMMARY OF THE INVENTION

In the high pressure tank apparatus provided with a container and sensor in the manner described above, the temporarily released fluid and the leaked fluid are held in the container in the same manner, so that when the temporarily released fluid that is drawn out during normal operation is detected by the sensor, there is a concern that this fluid will be erroneously sensed as leaked fluid that leaks out when an abnormality occurs.

It is an object of the present invention to provide a high pressure tank apparatus that, during normal operation, can avoid erroneously sensing that leaking occurs due to an abnormality, and that can also suitably guide the temporarily released fluid to a predetermined discharge region.

According to an embodiment of the present invention, provided is a high pressure tank apparatus, comprising a high pressure tank, in which fluid is supplied to and discharged from a liner made of resin of the high pressure tank, via a supply/discharge flow path, wherein the high pressure tank includes a reinforced layer configured to cover an outer surface of the liner; an insertion member configured to be connected to the supply/discharge flow path via a connecting portion, and including therein a supply/discharge hole configured to communicate with an inside of the liner and the supply/discharge flow path; and a supply/discharge side cap including a supply/discharge side draw-out hole configured to draw out the fluid interposed between the liner and the reinforced layer and an insertion hole through which the insertion member is inserted, and the high pressure tank apparatus further comprises a leaked fluid container configured to contain leaked fluid that is the fluid leaked from at least the connecting portion; and a supply/discharge side discharge flow path provided independently from the leaked fluid container and configured to guide a temporarily released fluid that is the fluid drawn out via the supply/discharge side draw-out hole to a predetermined discharge region.

The connecting portion that connects the supply/discharge flow path and a supply/discharge hole is at a location set such that fluid leakage does not occur during normal operation of the high pressure tank apparatus. Therefore, the leaked fluid leaked at least from the connecting portion is fluid that is leaked due to an abnormality occurring in the high pressure tank apparatus. On the other hand, the temporarily released fluid is fluid that is drawn out to the outside of the covered portion via the supply/discharge side draw-out hole after passing through the liner to intrude into the region between the reinforced layer and the outer surface of the liner (also referred to below as the covered portion) during normal operation of the high pressure apparatus.

In this high pressure tank apparatus, the leaked fluid container that contains the leaked fluid and the supply/discharge side discharge flow path that guides the temporarily released fluid to the discharge region are provided separately. Due to this, it is possible to contain the leaked fluid in the leaked fluid container, separately from the temporarily released fluid, and therefore it is possible to sense the leaked fluid that leaks during an abnormality separately from the temporarily released fluid that is drawn out during normal operation. As a result, it is possible to avoid erroneous sensing that an abnormality causing leakage has occurred during normal operation of the high pressure tank apparatus. Furthermore, it is possible to favorably guide the temporarily released fluid to the discharge region via the supply/discharge side discharge flow path and the end side discharge flow path, i.e., it is possible to avoid discharging the temporarily released fluid to a region other than the discharge region.

In the high pressure tank apparatus above, it is preferable that an opening is formed in an exposed surface of the supply/discharge side cap, which is exposed from the liner and the reinforced layer, on a side of the supply/discharge side draw-out hole where the fluid is discharged, the high pressure tank apparatus further comprises a cover member configured to cover the opening of the supply/discharge side draw-out hole and an exposed portion of the insertion member exposed from the insertion hole, and expose the connecting portion, the connecting portion is arranged inside the leaked fluid container, which is cut off from an inside of the cover member, and the temporarily released fluid flows into the supply/discharge side discharge flow path via the inside of the cover member.

In this case, since the cover portion is provided such that the connecting portion is exposed, and since the inside of the cover member and the inside of the leaked fluid container which covers the connecting portion are cut off (sealed) from each other, the leaked fluid leaked form the connecting portion is contained in the leaked fluid container, without being contained inside the cover member. Furthermore, since the opening on the side of the supply/discharge side draw-out hole where the fluid is discharged is covered with the cover member, the temporarily released fluid drawn out by the supply/discharge side draw-out hole flows into the supply/discharge side discharge flow path via the inside of the cover member.

In other words, it is possible to contain the leaked fluid in the leaked fluid container separately from the temporarily released fluid, and also to cause the temporarily released fluid to flow into the supply/discharge side discharge flow path, separately from the leaked fluid. Accordingly, using a simple configuration in which the cover portion is provided as described above, it is possible to sense the leaked fluid separately from the temporarily released fluid, and it is also possible to favorably guide the temporarily released fluid to the discharge region.

It is preferable that the high pressure tank apparatus above further comprises a cover member configured to cover an exposed portion of the insertion member exposed from the insertion hole and the connecting portion, and that a first communicating portion configured to contain the leaked fluid and be in communication with the leaked fluid container, and a second communicating portion configured to be cut off from the first communicating portion, are provided inside the cover member, and the supply/discharge side draw-out hole and the supply/discharge side discharge flow path are configured to be in communication with each other via the second communicating portion.

In this case, it is possible to contain the leaked fluid leaked from the connecting portion in the leaked fluid container via the first communicating portion inside the cover member. Furthermore, it is possible to cause the temporarily released fluid drawn out from the supply/discharge side draw-out hole to flow to the supply/discharge side discharge flow path, via the second communicating member that is cut off from the first communicating member, to be guided to the discharge region.

In other words, it is possible to contain the leaked fluid in the leaked fluid container separately from the temporarily released fluid, and also to cause the temporarily released fluid to flow into the supply/discharge side discharge flow path, separately from the leaked fluid. Accordingly, using a simple configuration in which the cover portion is provided as described above, it is possible to sense the leaked fluid separately from the temporarily released fluid, and it is also possible to favorably guide the temporarily released fluid to the discharge region.

In the high pressure tank apparatus above, it is preferable that the high pressure tank further includes an end side cap, an end side draw-out hole configured to draw out the fluid between the liner and the reinforced layer is provided in the end side cap, and the high pressure tank apparatus further comprises an end side discharge flow path provided independently from the leaked fluid container, and configured to guide temporarily released fluid, which is the fluid drawn out via the end side draw-out hole, to the discharge region.

In this case, the fluid that has intruded into the covered portion can also be drawn out as the temporarily released fluid by the end side draw-out hole provided in the end side cap of the high pressure tank, and it is possible to guide the temporarily released fluid to the discharge region via the end side discharge flow path, separately from the leaked fluid. Due to this, it is possible to more effectively restrict the accumulation of fluid in the covered portion, and therefore it is possible to avoid peeling of the liner and reinforced member and the occurrence of buckling or the like causing the liner to protrude toward the inside thereof, and it is also possible to further improve the durability of the high pressure tank.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes examples of preferred embodiments of a high pressure tank according to the present embodiment, while referencing the accompanying drawings. In the drawings below, configurational components realizing identical or similar functions and effects are given the same reference numerals, and repetitive descriptions are omitted.

The high pressure tank apparatus according to the present invention is mounted in a mounting body, which is a fuel cell vehicle such as a fuel cell electrical automobile, for example, and can be suitably used as an apparatus including a high pressure tank housing hydrogen gas to be supplied to a fuel cell system. In the present embodiment, an example is described in which the mounting body is a fuel cell vehicle and the high pressure tank contains hydrogen gas therein as a fluid, but the present invention is not particularly limited to this. The high pressure tank apparatus may be mounted in a mounting body other than a fuel cell vehicle, and a fluid other than hydrogen gas can be contained in the high pressure tank.

Figure 1:
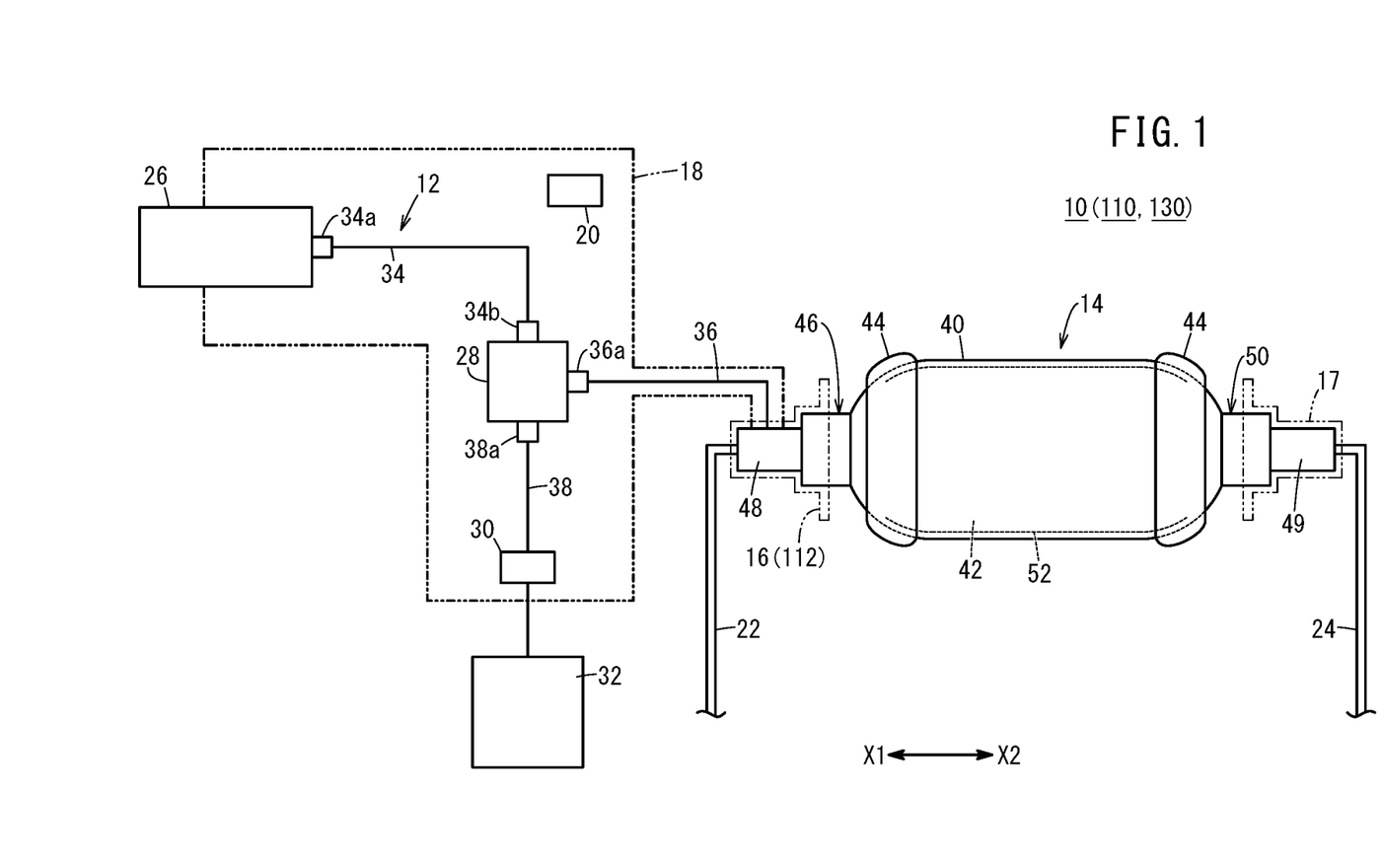
FIG. 1 is a schematic configurational view of the high pressure tank apparatus and the supply/discharge flow path according the first embodiment of the present invention.

As shown in FIG. 1, a high pressure tank apparatus 10 according to the first embodiment mainly includes a high pressure tank 14 that supplies and discharges hydrogen gas via a supply/discharge flow path 12, cover members 16, 17, a leaked fluid container 18, a leak detection sensor 20, a supply/discharge side discharge flow path 22, and an end side discharge flow path 24.

The supply/discharge flow path 12 is configured to be able to supply hydrogen gas supplied from a filling port 26 to the high pressure tank 14 via a branching path 28, and to supply hydrogen gas discharged from the high pressure tank 14 to a regulator 30 via the branching path 28 and then supply this gas, after being pressure adjusted, to a fuel cell system 32. In this case, the supply/discharge flow path 12 is formed by a pipe 34 that provides a connection between the filling port 26 and the branching path 28, a pipe 36 that connects the branching path 28 and the high pressure tank 14, a pipe 38 that connects the fuel cell system 32 to the branching path 28 via the regulator 30, and the like.

A connecting portion 34a is provided between one end of the pipe 34 and the filling port 26, and a connecting portion 34b is provided between the other end of the pipe 34 and the branching path 28. A connecting portion 36a is provided between one end of the pipe 36 and the branching path 28, and a connecting portion 36b (see the connecting portion in FIG. 2) is provided between the other end of the pipe 36 and the high pressure tank 14. A connecting portion 38a is provided between one end of the pipe 38 and the branching path 28. These connecting portions 34a, 34b, 36a, 36b, 38a are each formed to be air tight, such that leakage of the hydrogen gas does not occur during normal operation of the high pressure tank apparatus 10.

Figure 2:
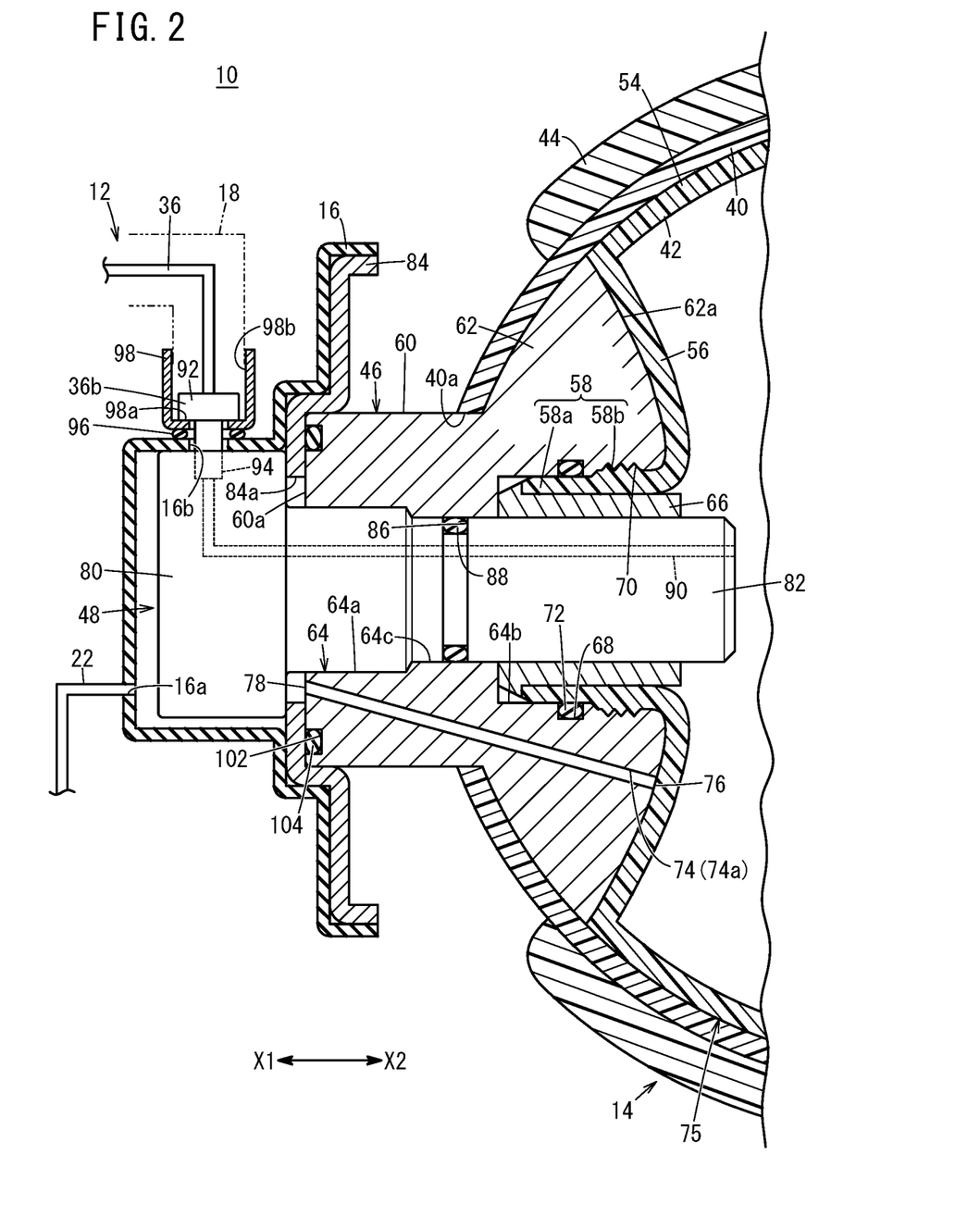
FIG. 2 is an enlarged cross-sectional view of main components on one axial-direction end side of the high pressure tank apparatus of FIG. 1.
Figure 3:
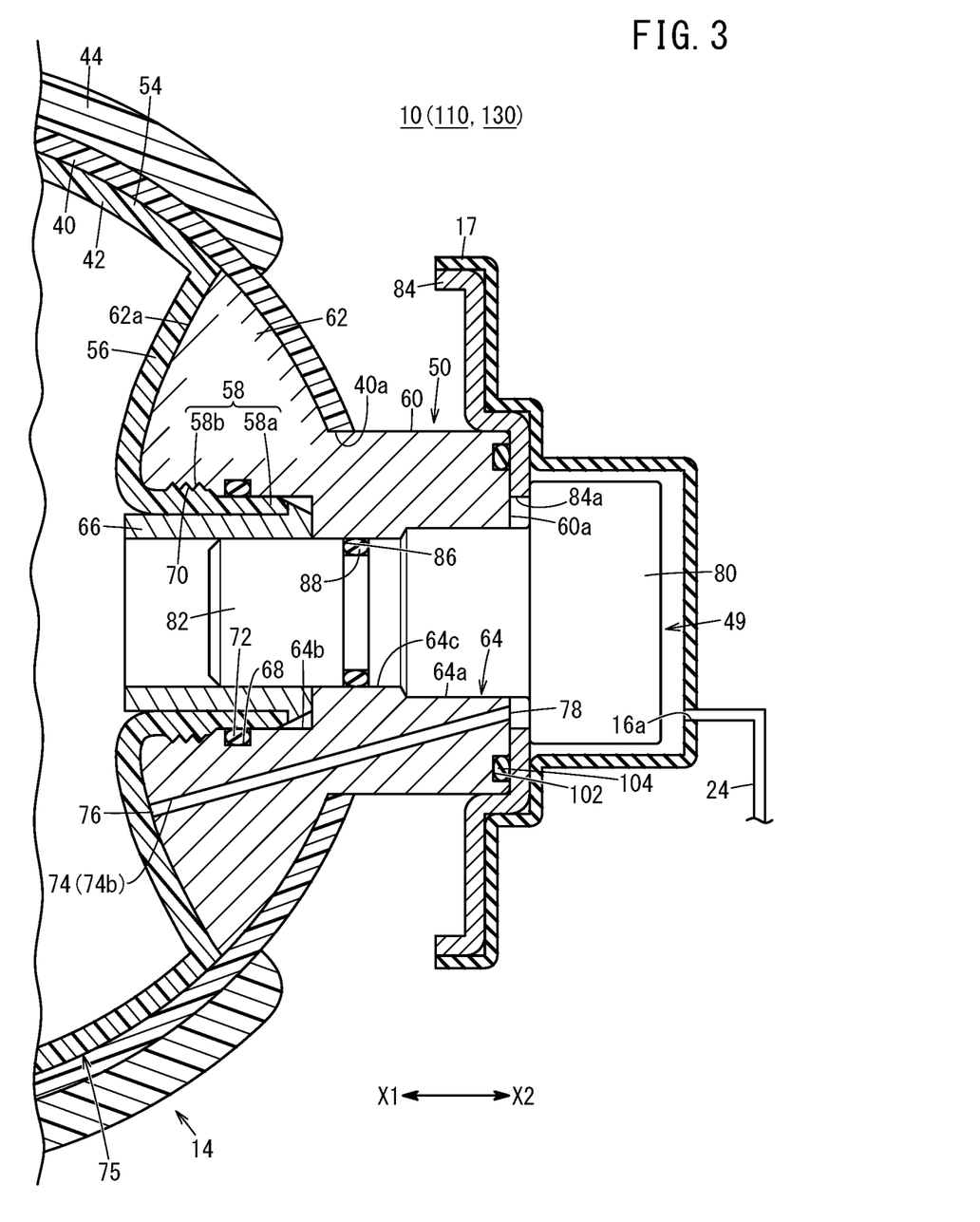
FIG. 3 is an enlarged cross-sectional view of main components on the other axial-direction end side of the high pressure tank apparatus of FIG. 1.

As shown in FIGS. 1 to 3, the high pressure tank 14 includes a reinforced layer 40, a liner 42, a protective member 44, a supply/discharge side cap 46, insertion members 48, 49, and an end side cap 50. In the high pressure tank 14, the supply/discharge side cap 46 is provided at one end side (the arrow X1 side in FIG. 1) in an axial direction of the high pressure tank 14 (the axial direction of the high pressure tank 14 is referred to below simply as the axial direction), and the end side cap 50 is provided at the other end side (the arrow X2 side in FIG. 1) in the axial direction.

The reinforced layer 40 is made of carbon fiber reinforced plastic (CFRP), for example, and covers the outer surface and the like of the liner 42. The liner 42 is a hollow body made of resin, and can contain the hydrogen gas therein. Specifically, the liner 42 includes a tube-shaped trunk portion 52 (see FIG. 1) and, as shown in FIG. 2 and FIG. 3, also includes dome-shaped portions 54 provided on respective axial-direction sides of the trunk portion 52, sunken portions 56 provided respectively to the dome-shaped portions 54 at the axial direction ends, and a cylindrical portion 58 having a smaller diameter than the trunk portion 52 and protruding from each sunken portion 56. In the present embodiment, the reinforced layer 40 and the liner 42 are formed in substantially the same manner at one side and the other side thereof in the axial direction.

The sunken portion 56 is depressed toward the inside of the liner 42 where the hydrogen gas is contained. A thin portion 58a is provided on a protruding end side (the arrow X1 side in FIG. 2) of the cylindrical portion 58, and a male screw 58b is formed farther on a base end side (the arrow X2 side in FIG. 2) than the thin portion 58a.

The protective member 44 is made of resin or the like, for example, and mainly covers a region at and around the boundary portion between the dome-shaped portion 54 and the trunk portion 52 of the liner 42, with the reinforced layer 40 interposed therebetween. By providing the protective member 44 in this manner, it is possible to improve the shock resistance and the like of the high pressure tank 14.

As shown in FIG. 2, the supply/discharge side cap 46 is made of metal, for example, and is attached to the exterior of the cylindrical portion 58 of the liner 42. Furthermore, the supply/discharge side cap 46 includes a tube-shaped protruding portion 60 and a shoulder portion 62 that extends radially outward from the base end of the protruding portion 60, and an insertion hole 64 is formed penetrating through the protruding portion 60 in the axial direction. In the shoulder portion 62, an end surface 62a that is on the opposite side of the protruding portion 60 (on the arrow X2 side in FIG. 2) faces the outer surface of the sunken portion 56 of the liner 42. Furthermore, the outer circumferential surface of the shoulder portion 62, together with the trunk portion 52 and the dome-shaped portion 54 of the liner 42, is covered with the reinforced layer 40. The protruding portion 60 protrudes from an opening 40a provided in the reinforced layer 40, in a manner to be exposed therefrom.

The insertion hole 64 has a diameter that changes depending on the position along the insertion hole 64, and is formed by a medium inner diameter hole 64a positioned on a tip surface 60a (exposed surface) of the protruding portion 60, a large inner diameter hole 64b positioned on the end surface 62a side of the shoulder portion 62, and a small inner diameter hole 64c positioned between the medium inner diameter hole 64a and the large inner diameter hole 64b. The cylindrical portion 58 of the liner 42 is inserted into the large inner diameter hole 64b, and a tube-shaped collar 66 is press-fitted into the cylindrical portion 58. In this way, the cylindrical portion 58 is supported between the inner circumferential surface of the large inner diameter hole 64b and the outer circumferential surface of the collar 66.

A ring-shaped seal groove 68 is formed along the circumferential direction on an inner wall of the large inner diameter hole 64b at a position facing the thin portion 58a of the cylindrical portion 58, and a female screw 70 that engages with the male screw 58b is formed at a position facing the male screw 58b of the cylindrical portion 58. A seal member 72 made from an O-ring is arranged inside the seal groove 68, thereby creating a seal between the outer circumferential surface of the cylindrical portion 58 and the inner circumferential surface of the large inner diameter hole 64b. Furthermore, by having the male screw 58b engage with the female screw 70, the cylindrical portion 58 of the liner 42 and the supply/discharge side cap 46 are joined to each other.

A draw-out hole 74 is further formed in the supply/discharge side cap 46. The draw-out hole 74 is provided to guide the hydrogen gas interposed between the liner 42 and the reinforced layer 40 (also referred to below as a covered portion 75) to the outside of the covered portion 75. Specifically, the draw-out hole 74 has one opening 76 provided in the end surface 62a of the supply/discharge side cap 46, and another opening 78 provided in the tip surface 60a of the protruding portion 60. In other words, the hydrogen gas that has intruded into the covered portion 75 flows into the draw-out hole 74 via the one opening 76, and is discharged from the draw-out hole 74 via the other opening 78. The hydrogen gas that has been drawn to the outside of the covered portion 75 by the draw-out hole 74 in this manner is referred to below as the temporarily released fluid (or regularly released fluid). One draw-out hole 74 may be provided to the supply/discharge side cap 46, or a plurality of draw-out holes 74 may be provided at uniform intervals in the circumferential direction of the supply/discharge side cap 46.

The insertion member 48 includes a head portion 80 with an outer diameter greater than the diameter of the medium inner diameter hole 64a, and an insertion portion 82 that extends from the head portion 80 toward the inside of the insertion hole 64. In the insertion member 48, the insertion portion 82 is inserted into the insertion hole 64 along the circumferential surfaces of the medium inner diameter hole 64a and the small inner diameter hole 64c and the inner circumferential surface of the collar 66. At this time, a support plate 84 for attaching the cover member 16 to the high pressure tank 14, as described further below, is clamped between the head portion 80 of the insertion member 48 exposed from the insertion hole 64 and the tip surface 60a of the protruding portion 60.

A ring-shaped seal groove 86 is formed along the circumferential direction in the outer circumferential surface of the part of the insertion portion 82 facing the small inner diameter hole 64c in the insertion hole 64, and a seal member 88 made from an O-ring is arranged inside this seal groove 86. Due to this, a seal is formed between the outer circumferential surface of the insertion portion 82 and the inner circumferential surface of the insertion hole 64.

Furthermore, a supply/discharge hole 90 is formed penetrating through the inside of the insertion member 48. The pipe 36 of the supply/discharge flow path 12 is connected to the supply/discharge hole 90 via the connecting portion 36b. Due to this, the supply/discharge hole 90 is in communication with the inside of the liner 42 and the supply/discharge flow path 12. Furthermore, a main stop valve (electromagnetic valve), not shown in the drawings, is housed inside the insertion member 48, and by opening and closing this main stop valve, it is possible to switch between a state of communication and a state of separation between the inside of the liner 42 and the supply/discharge flow path 12.

The connecting portion 36b is formed by a large outer diameter portion 92 and a small outer diameter portion 94 with a smaller outer diameter than the large outer diameter portion 92, and the pipe 36 is inserted through the connecting portion 36b. Furthermore, by inserting part of the small outer diameter portion 94 into the supply/discharge hole 90, the connecting portion 36b is secured to the head portion 80 of the insertion member 48. As described further below, the cover member 16, a seal member 96, and a separation member 98 are interposed between the head portion 80 and the large outer diameter portion 92.

As shown in FIG. 3, the end side cap 50 is formed in the same manner as the supply/discharge side cap 46 (see FIG. 2). In other words, the end side cap 50 is attached to the exterior of the cylindrical portion 58 of the liner 42, via the insertion hole 64. Furthermore, the end side cap 50 also has the draw-out hole 74 formed penetrating therethrough to lead the hydrogen gas that has intruded into the covered portion 75 to the outside of the covered portion 75. Below, the draw-out hole 74 provided in the supply/discharge side cap 46 is also referred to as the supply/discharge side draw-out hole 74a, and the draw-out hole 74 provided in the end side cap 50 is also referred to as the end side draw-out hole 74b.

The insertion member 49 is inserted into the insertion hole 64 of the end side cap 50. The insertion member 49 has a similar configuration as the insertion member 48, except that the supply/discharge hole 90 is not formed in the insertion member 49, the main stop valve described above is not housed in the insertion member 49, and the axial-direction length of the insertion portion 82 is shorter in the insertion member 49. The support plate 84 for attaching the cover member 17 to the high pressure tank 14, as described further below, is clamped between the head portion 80 of the insertion member 49 exposed from the insertion hole 64 and the tip surface 60a of the protruding portion 60 of the end side cap 50.

As shown in FIG. 2, by clamping the support plate 84 between the head portion 80 and the protruding portion 60 as described above, the axial-direction ends of the high pressure tank 14 are respectively attached in a manner to cover the tip side of the protruding portion 60. Specifically, a plate penetration hole 84a with a larger diameter than the outer diameter of the insertion portion 82 and a smaller diameter than the outer diameter of the head portion 80 is provided substantially in the center of the support plate 84. In other words, the insertion portion 82 is inserted into the plate penetration hole 84a and the insertion hole 64 that overlap in a coaxial manner.

A ring-shaped seal groove 102 is formed at a location on the tip surface 60a of the protruding portion 60 that faces the support plate 84 farther outward in the radial direction of the protruding portion 60 than the opening 78 on the side of the draw-out hole 74 where the temporarily released fluid is discharged. By arranging a seal member 104 made from an O-ring inside this seal groove 102, a seal is formed between the protruding portion 60 and the support plate 84.

The cover member 16 is made of rubber, stainless steel (SUS), or the like, for example, and is attached to the support plate 84 in a manner to cover the opening 78 of the supply/discharge side draw-out hole 74a and the head portion 80 that is the exposed portion exposed from the insertion hole 64 of the insertion member 48. In this way, the cover member 16 is capable of containing therein the temporarily released fluid that is drawn out by the supply/discharge side draw-out hole 74a. Furthermore, an insertion hole 16a, through which the supply/discharge side discharge flow path 22 is inserted, is formed penetrating through the cover member 16, the supply/discharge side discharge flow path 22 and the inside of the cover member 16 are in communication with each other via the insertion hole 16a. Therefore, as described above, the temporarily released fluid contained inside the cover member 16 can flow into the supply/discharge side discharge flow path 22.

Furthermore, a penetration hole 16b, which exposes the connecting portion 36b secured to the head portion 80 of the insertion member 48, is formed in the cover member 16. The diameter of the penetration hole 16b is smaller than the outer diameter of the large outer diameter portion 92 of the connecting portion 36b and larger than the outer diameter of the small outer diameter portion 94. As described above, the outer circumferential portion of the penetration hole 16b of the cover member 16, the seal member 96 formed by an O-ring, and the separation member 98 are clamped between the large outer diameter portion 92 of the connecting portion 36b and the head portion 80 of the insertion member 48.

The separation member 98 is a closed-bottom cylinder having a floor portion 98a at one end, and the small outer diameter portion 94 of the connecting portion 36b is inserted into a penetration hole formed in the floor portion 98a. Furthermore, the leaked fluid container 18 is connected integrally on an opening portion 98b side of the separation member 98. Due to the seal member 96 being interposed between the floor portion 98a of the separation member 98 and the cover member 16, the inside of the cover member 16 and the inside of the leaked fluid container 18 are cut off (sealed) from each other.

The cover member 17 is formed in the same manner as the cover member 16, except that the cover member 17 is not provided with the penetration hole 16b, and is attached to the support plate 84 in a manner to cover the opening 78 of the end side draw-out hole 74b and the head portion 80, which is an exposed portion exposed from the insertion hole 64 of the insertion member 49. Due to this, the cover member 17 is capable of containing therein the temporarily released fluid that has been drawn out through the end side draw-out hole 74b. Furthermore, the insertion hole 16a through which the end side discharge flow path 24 is inserted is formed penetrating through the cover member 17, such that the inside of the cover member 17 and the end side discharge flow path 24 are in communication via the insertion hole 16a. Therefore, as described above, the temporarily released fluid contained inside the cover member 17 can flow into the end side discharge flow path 24.

As shown in FIG. 1 and FIG. 2, the leaked fluid container 18 is formed by wall portions that surround at least the supply/discharge flow path 12 that includes the connecting portion 36b that connects the supply/discharge hole 90 and the pipe 36 of the supply/discharge flow path 12 and the other connecting portions 34a, 34b, 36a, 38a. Due to this, the leaked fluid container 18 is capable of containing the leaked fluid that is leaked out, due to an abnormality occurring in the high pressure tank apparatus 10, from locations, such as the connecting portion 36b, which are set so that hydrogen leakage does not occur here during normal operation of the high pressure tank apparatus 10.

The leak detection sensor 20 (see FIG. 1) is arranged inside the leaked fluid container 18, and senses the hydrogen gas inside the leaked fluid container 18. Any of various hydrogen sensors capable of sensing the presence of a hydrogen gas leak or a leakage amount (concentration) of hydrogen gas can be used as the leak detection sensor 20.

The supply/discharge side discharge flow path 22 is in communication with the inside of the cover member 16, and guides the temporarily released fluid, which has flowed in from inside the cover member 16, to a predetermined discharge region (not shown in the drawings). The discharge region is a location suitable for discharging the temporarily released fluid, such as in the atmosphere where there is wind flow outside of the mounting body (not shown in the drawings), for example. The end side discharge flow path 24 is in communication with the inside of the cover member 17, and guides the temporarily released fluid, which has flowed in from inside the cover member 17, to the discharge region described above.

The high pressure tank apparatus 10 according to the first embodiment is basically configured in the manner described above. During normal operation of the high pressure tank apparatus 10, as shown in FIG. 1 and FIG. 2 for example, the hydrogen gas supplied to the supply/discharge flow path 12 from a hydrogen supply source (not shown in the drawing) via the filling port 26 is supplied into the liner 42 via the pipe 34, the branching path 28, the pipe 36, the supply/discharge hole 90, and the main stop valve that is in an open state. When the liner 42 is sufficiently filled with hydrogen gas as a result of this supplying, the supply of hydrogen gas from the hydrogen supply source is stopped.

When supplying the hydrogen gas in the liner 42 to the fuel cell system 32, the hydrogen gas expelled to the pipe 36 from inside the liner 42, via the supply/discharge hole 90 and the main stop valve in the open state, is sent to the regulator 30. This hydrogen gas undergoes a pressure adjustment by the regulator 30, and is then supplied to the fuel cell system 32 via the pipe 38.

When the internal pressure of the liner 42 drops due to the hydrogen gas being expelled in the manner described above, the pressing force with which the liner 42 is pressed toward the reinforced layer 40 becomes small, and therefore it is easy for the hydrogen gas that has passed through the liner 42 to intrude into the covered portion 75. In the hydrogen gas that has intruded into the covered portion 75, the temporarily released fluid that has been drawn out through the supply/discharge side draw-out hole 74a flows into the supply/discharge side discharge flow path 22 from the inside of the cover member 16 via the insertion hole 16a, to be guided to the discharge region. Furthermore, in the hydrogen gas that has intruded into the covered portion 75, the temporarily released fluid that has been drawn out through the end side draw-out hole 74b flows into the end side discharge flow path 24 from the inside of the cover member 17 via the insertion hole 16a, to be output to the discharge region.

On the other hand, when an abnormality occurs in the high pressure tank apparatus 10, such as a case where the connecting portions 34a, 34b, 36a, 36b, 38a become loosened, for example, the leaked fluid that has leaked out from the connecting portion 36b and the supply/discharge flow path 12 is contained inside the leaked fluid container 18. At this time, the inside of the cover member 16 and the inside of the leaked fluid container 18 are cut off from each other, as described above, and therefore the leaked fluid is contained in the leaked fluid container 18 without intruding inside the cover member 16.

In other words, it is possible to contain the leaked fluid in the leaked fluid container 18 separately from the temporarily released fluid, and also to cause the temporarily released fluid to flow into the supply/discharge side discharge flow path 22 and the end side discharge flow path 24, separately from the leaked fluid. In this way, by using the leak detection sensor 20 to sense the leaked fluid inside the leaked fluid container 18 that does not include the temporarily released fluid, it is possible to sense the leaked fluid that leaks during an abnormality, separately from the temporarily released fluid that is drawn out during normal operation. As a result, it is possible to avoid erroneous sensing that an abnormality causing leakage has occurred during normal operation of the high pressure tank apparatus 10.

Furthermore, it is possible to favorably guide the temporarily released fluid to the discharge region via the supply/discharge side discharge flow path 22 and the end side discharge flow path 24, i.e., it is possible to avoid discharging the temporarily released fluid to a region other than the discharge region. Therefore, even in a case where the high pressure tank apparatus 10 is arranged below the floor (not shown in the drawings) of the mounting body that is a fuel cell vehicle, there is no worry that the hydrogen gas would intrude into the cabin (not shown in the drawings) through the floor. Accordingly, for the mounting body, there is no need to provide a structure for increasing the seal of the floor, and so it is possible to easily mount the high pressure tank apparatus 10 at a low cost.

As described above, by favorably guiding the temporarily released fluid to the discharge region via the supply/discharge side discharge flow path 22 and the end side discharge flow path 24, it is possible to effectively restrict the accumulation of fluid in the covered portion 75. As a result, it is possible to restrict the phenomena such as the liner 42 peeling away from the reinforced layer 40 or so-called buckling in which the portion of the liner 42 peeling away from the reinforced layer 40 bulges toward the inside of the liner 42, and it is also possible to improve the durability of the high pressure tank 14.

Figure 4:
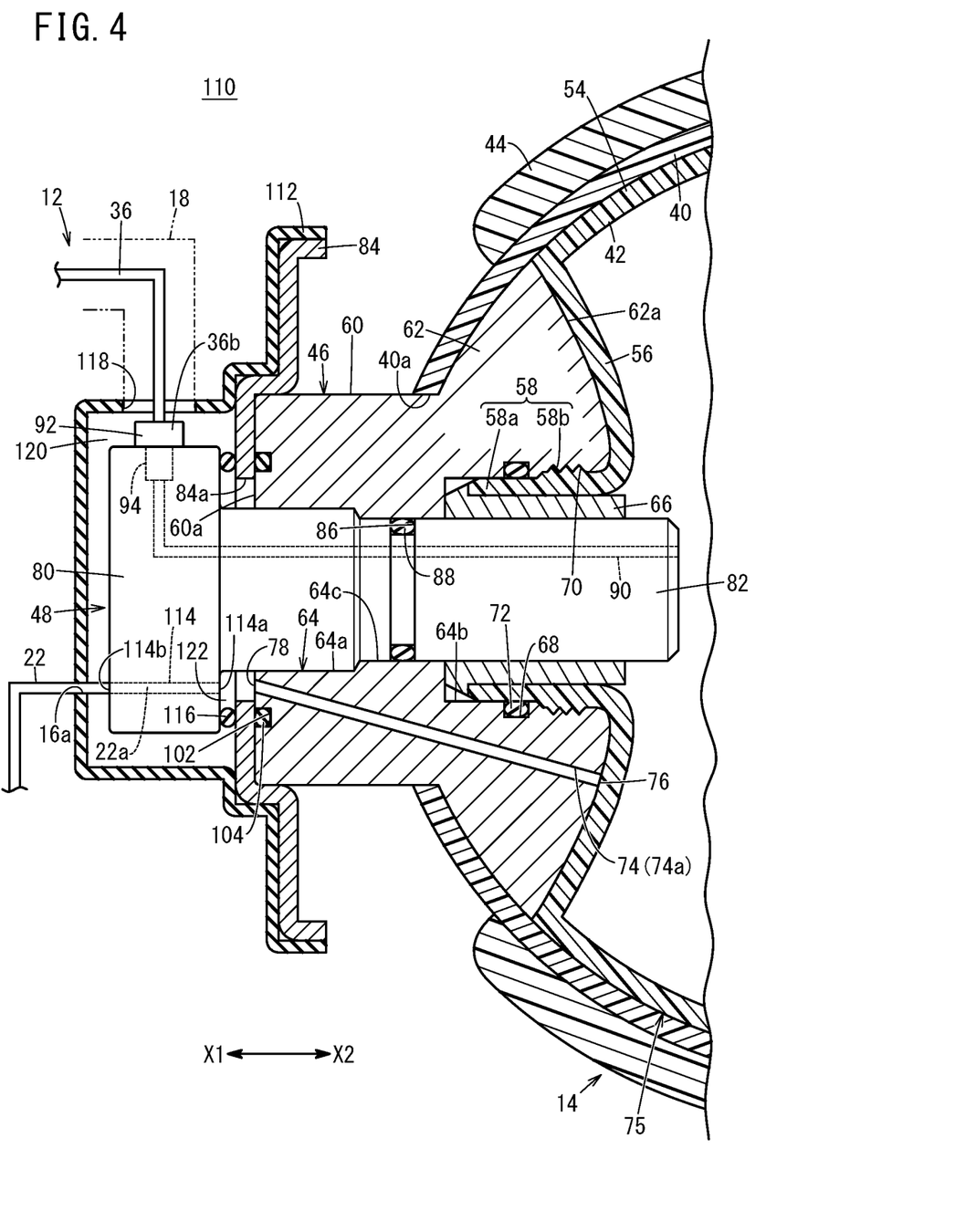
FIG. 4 is an enlarged cross-sectional view of main components on one axial-direction end side of the high pressure tank apparatus according to the second embodiment.

The following describes a high pressure tank apparatus 110 according to a second embodiment, while referencing FIGS. 1, 3, and 4. The high pressure tank apparatus 110 according to the second embodiment mainly differs from the high pressure tank apparatus 10 according to the first embodiment with regard to the following points. Specifically, the high pressure tank apparatus 110 includes a cover member 112 instead of the cover member 16. Furthermore, in the high pressure tank apparatus 110, a communication hole 114 is formed penetrating through the head portion 80 of the insertion member 48, and a pipe 22a forming the supply/discharge side discharge flow path 22 is inserted through the communication hole 114. Furthermore, in the high pressure tank apparatus 110, a seal member 116 is interposed between the support plate 84 and the head portion 80 of the insertion member 48.

The cover member 112 is made of rubber or stainless steel (SUS), for example, and is attached to the support plate 84 in a manner to cover the connecting portion 36b and the head portion 80 of the insertion member 48. A cover penetration hole 118, through which the pipe 36 extending from the connecting portion 36b is inserted, is formed in the portion of the cover member 112 facing the connecting portion 36b. A first communicating portion 120 inside the cover member 112 and the leaked fluid container 18 are in communication with each other via the cover penetration hole 118.

The communication hole 114 has an opening 114a, formed on one end side (the arrow X2 side in FIG. 4) in the extension direction, which the opening 78 of the supply/discharge side draw-out hole 74a, and has an opening 114b, formed on the other end side (the arrow X1 side in FIG. 4) in the extension direction, which faces the insertion hole 16a formed in the cover member 112. The pipe 22a inserted into the communication hole 114 extends to the outside of the cover member 112, through the insertion hole 16a.

The seal member 116 and the seal member 104 form the first communicating portion 120 and a second communicating portion 122, cut off from each other, inside the cover member 112. The first communicating portion 120 is capable of containing the leaked fluid that has leaked from the connecting position 36b, and also is in communication with the inside of the leaked fluid container 18 via the cover penetration hole 118. The second communicating portion 122 is a space surrounded by the surface of the head portion 80 on the side where the opening 114a is formed, the seal member 116, the inner circumferential surface of the plate penetration hole 84a, and the side of the tip surface 60a that is closer to the center in the radial direction than the seal groove 102. The supply/discharge side draw-out hole 74a and the supply/discharge side discharge flow path 22 are in communication with each other via the second communicating portion 122.

Accordingly, in the high pressure tank apparatus 110, it is possible to cause the temporarily released fluid drawn out from the supply/discharge side draw-out hole 74a to flow through the supply/discharge side discharge flow path 22 and be guided to the discharge region, without flowing into the inside of the first communicating portion 120 and the leaked fluid container 18.

Based on the above, with the high pressure tank apparatus 110 as well, it is possible to achieve the same effect as the high pressure tank apparatus 10 according to the first embodiment.

Figure 5:
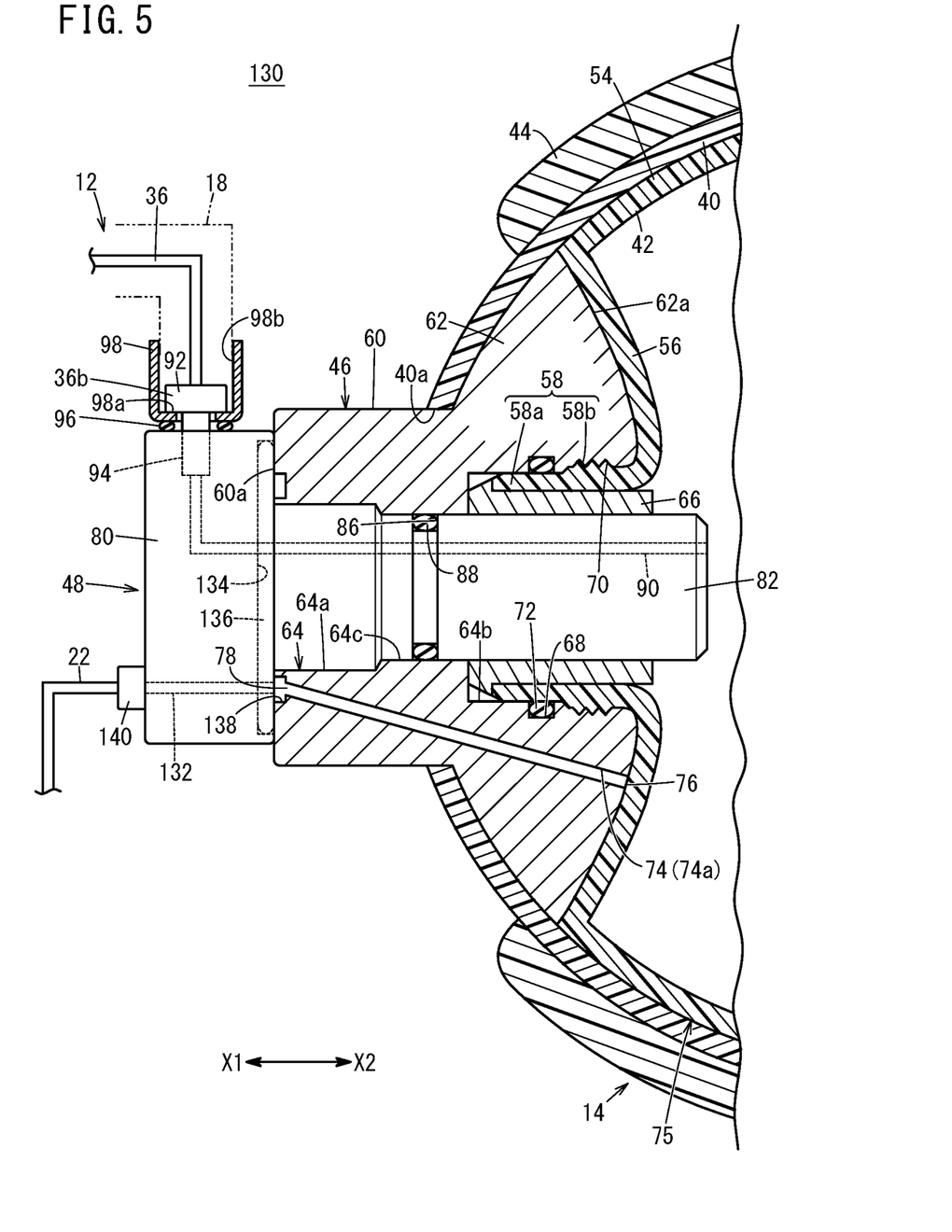
FIG. 5 is an enlarged cross-sectional view of main components on one axial-direction end side of the high pressure tank apparatus according to the third embodiment.

The following describes a high pressure tank apparatus 130 according to a third embodiment, while referencing FIGS. 1, 3, and 5. The high pressure tank apparatus 130 according to the third embodiment mainly differs from the high pressure tank apparatus 10 according to the first embodiment with regard to the following points. Specifically, the high pressure tank apparatus 130 does not include the cover member 16 and the support plate 84 (see FIG. 2). Furthermore, in the high pressure tank apparatus 130, a communication hole 132 is formed penetrating trough the head portion 80 of the insertion member 48. In addition, in the high pressure tank apparatus 130, a seal groove 134 is provided in the head portion 80 of the insertion member 48, instead of the seal groove 102 (see FIG. 2) formed in the tip surface 60a of the protruding portion 60 of the supply/discharge side cap 46.

The seal groove 134 is formed in the surface of the head portion 80 facing the tip surface 60a farther outward in the radial direction of the protruding portion 60 than the opening 78 of the supply/discharge side draw-out hole 74a. By arranging the seal member 136 formed by an O-ring inside the seal groove 134, a seal is formed between the head portion 80 of the insertion member 48 and the side of the tip surface 60a of the protruding portion 60 farther radially outward than the opening 78.

If a plurality of supply/discharge side draw-out holes 74a are provided for the supply/discharge side cap 46, a ring-shaped communication groove 138 in communication in the circumferential direction with each of the openings 78 of the plurality of supply/discharge side draw-out holes 74a may be provided in the tip surface 60a. One end side of the communication hole 132 opens into the communication groove 138. The supply/discharge side discharge flow path 22 is connected to the other end side of the communication hole 132, via a connecting portion 140. Therefore, each of the plurality of supply/discharge side draw-out holes 74a is in communication with the supply/discharge side discharge flow path 22 via the communication groove 138 and the communication hole 132.

In the high pressure tank apparatus 130, the seal member 96 and the separation member 98 are clamped between the head portion 80 and the large outer diameter portion 92 of the connecting portion 36b. In other words, the leaked fluid container 18 is provided for the high pressure tank 14 independently from the supply/discharge side discharge flow path 22. Accordingly, in the high pressure tank apparatus 130, it is possible to contain the leaked fluid in the leaked fluid container 18, separately from the temporarily released fluid, and to cause the temporarily released fluid to flow into the supply/discharge side discharge flow path 22, separately from the leaked fluid. Based on the above, with the high pressure tank apparatus 130 as well, it is possible to achieve the same effect as the high pressure tank apparatus 10 according to the first embodiment.

The present invention is not limited to the above described embodiments, and various alterations can be added to the without deviating from the gist of the present invention.

In the high pressure tank apparatuses 10, 110, 130 described above, the high pressure tank 14 includes the end side cap 50 in which the end side draw-out hole 74b is formed, and the end side discharge flow path 24 is connected to this end side draw-out hole 74b, but the present invention is not particularly limited to this. For example, the high pressure tank 14 does not need to include the end side cap 50. Furthermore, the end side draw-out hole 74b does not need to be provided in the end side cap 50. In these cases, the high pressure tank apparatus 10 does not need to include the end side discharge flow path 24.

Furthermore, in the high pressure tank apparatuses 10, 110, 130, the end side cap 50 side of the high pressure tank 14 may be formed without including the cover member 16 and the support plate 84 in substantially the same manner as on the supply/discharge side cap 46 side of the high pressure tank apparatus 130 according to the third embodiment. In this case, the temporarily released fluid drawn out from the end side draw-out hole 74b flows into the end side discharge flow path 24 via the communication groove 138 and the communication hole 132 (see FIG. 5) provided in the end side cap 50, in the same manner as in the supply/discharge side cap 46 of the high pressure tank apparatus 130.

In the high pressure tank apparatus 10 described above, the temporarily released fluid flows into the supply/discharge side discharge flow path 22 via the inside of the cover member 16, and in the high pressure tank apparatus 110, the leaked fluid is contained in the leaked fluid container 18 via the inside of the cover member 112. However, the present invention is not particularly limited to this, and in the high pressure tank apparatuses 10, 110, 130, it is only necessary that the leaked fluid container 18 capable of containing the leaked fluid and the supply/discharge side discharge flow path 22 guiding the temporarily released fluid to the discharge region be provided independently.

In the high pressure tank apparatuses 10, 110, 130 described above, the leaked fluid container 18 can contain both the leaked fluid leaked from the connecting portion 36b and the leaked fluid leaked from the supply/discharge flow path 12 by having the leaked fluid container 18 surrounding both the connecting portion 36b and the supply/discharge flow path 12, but the leaked fluid container 18 only needs to be configured to be capable of containing the leaked fluid leaked from at least the connecting portion 36b.

The high pressure tank apparatuses 10, 110, 130 described above each include one high pressure tank 14, but may include a plurality of the high pressure tanks 14 instead. In this case, the leaked fluid leaked from the plurality of high pressure tanks 14 may be contained by one leaked fluid container 18, or a number of leaked fluid containers 18 equal to the number of high pressure tanks 14 may be provided such that the leaked fluid from each high pressure tank 14 is contained in a corresponding leaked fluid container 18.

The supply/discharge flow path 12 is not limited to being formed from the pipes 34, 36, 38, the branching path 28, and the like described above, and can adopt various configurations capable to supplying and discharging hydrogen gas (fluid) to and from the high pressure tank 14.

What is claimed is:

1. A high pressure tank apparatus, comprising a high pressure tank, in which fluid is supplied to and discharged from a liner made of resin of the high pressure tank, via a supply/discharge flow path, wherein
the high pressure tank includes:
a reinforced layer configured to cover an outer surface of the liner;
an insertion member configured to be connected to the supply/discharge flow path via a connecting portion, and including therein a supply/discharge hole configured to communicate with an inside of the liner and the supply/discharge flow path; and
a supply/discharge side cap including a supply/discharge side draw-out hole configured to draw out the fluid interposed between the liner and the reinforced layer, and an insertion hole through which the insertion member is inserted, and the high pressure tank apparatus further comprises:
a leaked fluid container configured to contain leaked fluid that is the fluid leaked from at least the connecting portion;
a leak detection sensor arranged inside the leaked fluid container, and configured to sense the leaked fluid inside the leaked fluid container; and
a supply/discharge side discharge flow path provided independently from the leaked fluid container and configured to guide a temporarily released fluid that is the fluid drawn out via the supply/discharge side draw-out hole to a predetermined discharge region.

2. The high pressure tank apparatus according to claim 1, wherein
an opening is formed in an exposed surface of the supply/discharge side cap, which is exposed from the liner and the reinforced layer, on a side of the supply/discharge side draw-out hole where the fluid is discharged,
the high pressure tank apparatus further comprises a cover member configured to cover the opening of the supply/discharge side draw-out hole and an exposed portion of the insertion member exposed from the insertion hole, and expose the connecting portion,
the connecting portion is arranged inside the leaked fluid container, which is cut off from an inside of the cover member, and
the temporarily released fluid flows into the supply/discharge side discharge flow path via the inside of the cover member.

3. The high pressure tank apparatus according to claim 1, further comprising:
a cover member configured to cover an exposed portion of the insertion member exposed from the insertion hole and the connecting portion,
wherein a first communicating portion configured to contain the leaked fluid and be in communication with the leaked fluid container, and a second communicating portion configured to be cut off from the first communicating portion, are provided inside the cover member, and
the supply/discharge side draw-out hole and the supply/discharge side discharge flow path are configured to be in communication with each other via the second communicating portion.

4. The high pressure tank apparatus according to claim 1, wherein
the high pressure tank further includes an end side cap,
an end side draw-out hole configured to draw out the fluid between the liner and the reinforced layer is provided in the end side cap, and
the high pressure tank apparatus further comprises an end side discharge flow path provided independently from the leaked fluid container, and configured to guide temporarily released fluid, which is the fluid drawn out via the end side draw-out hole, to the discharge region.

* * * * *